Feb. 6, 1968   P. B. RENTSCHLER   3,367,358
PIPE JUNCTURE COVERING DEVICE AND APPLYING METHOD
Filed Nov. 17, 1965   2 Sheets-Sheet 2
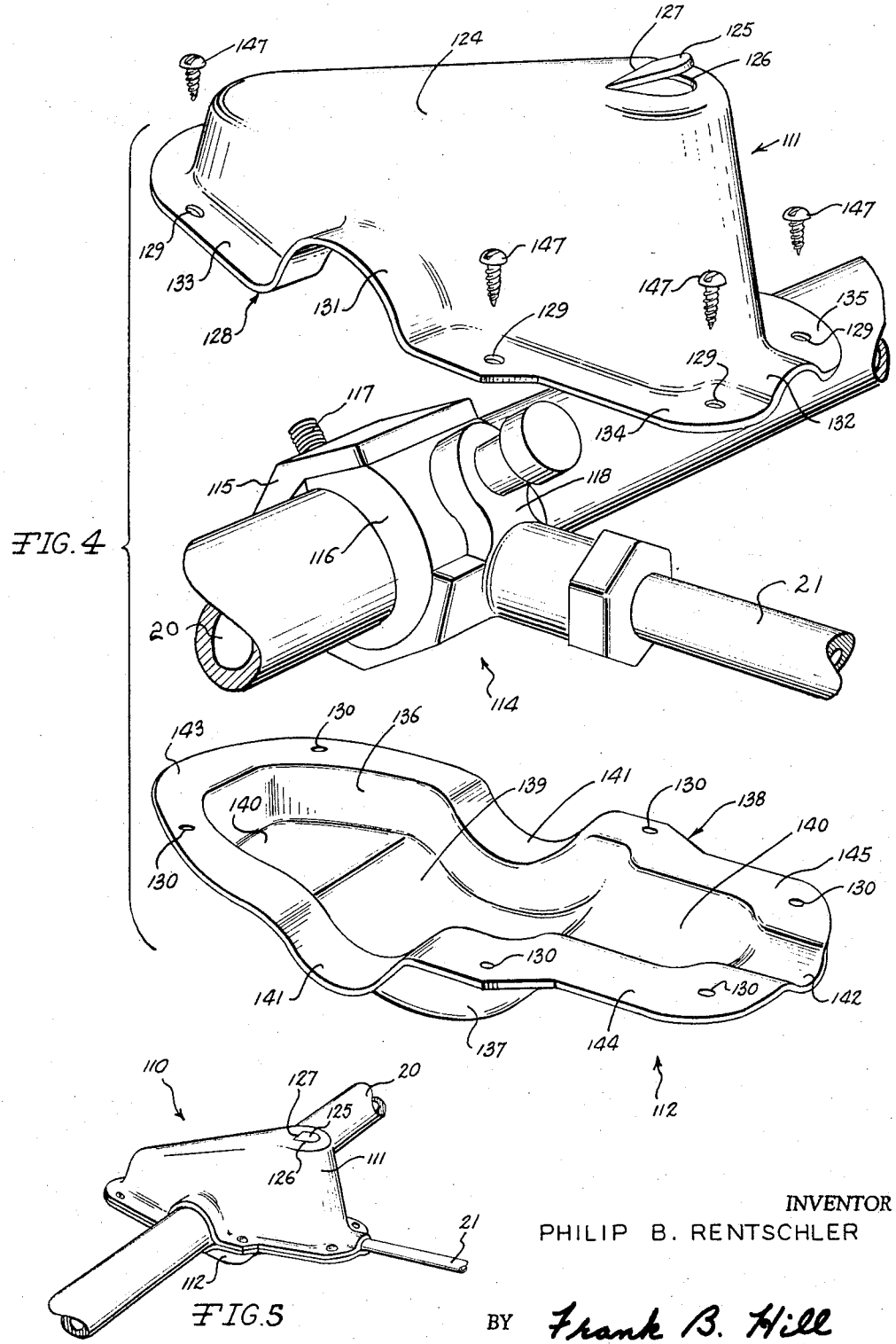
INVENTOR
PHILIP B. RENTSCHLER
BY Frank B. Hill
ATTORNEY 3,367,358
PIPE JUNCTURE COVERING DEVICE AND
APPLYING METHOD
Philip B. Rentschler, 214 3rd St., Jackson, Mich. 49201
Filed Nov. 17, 1965, Ser. No. 508,300
10 Claims. (Cl. 137—375)

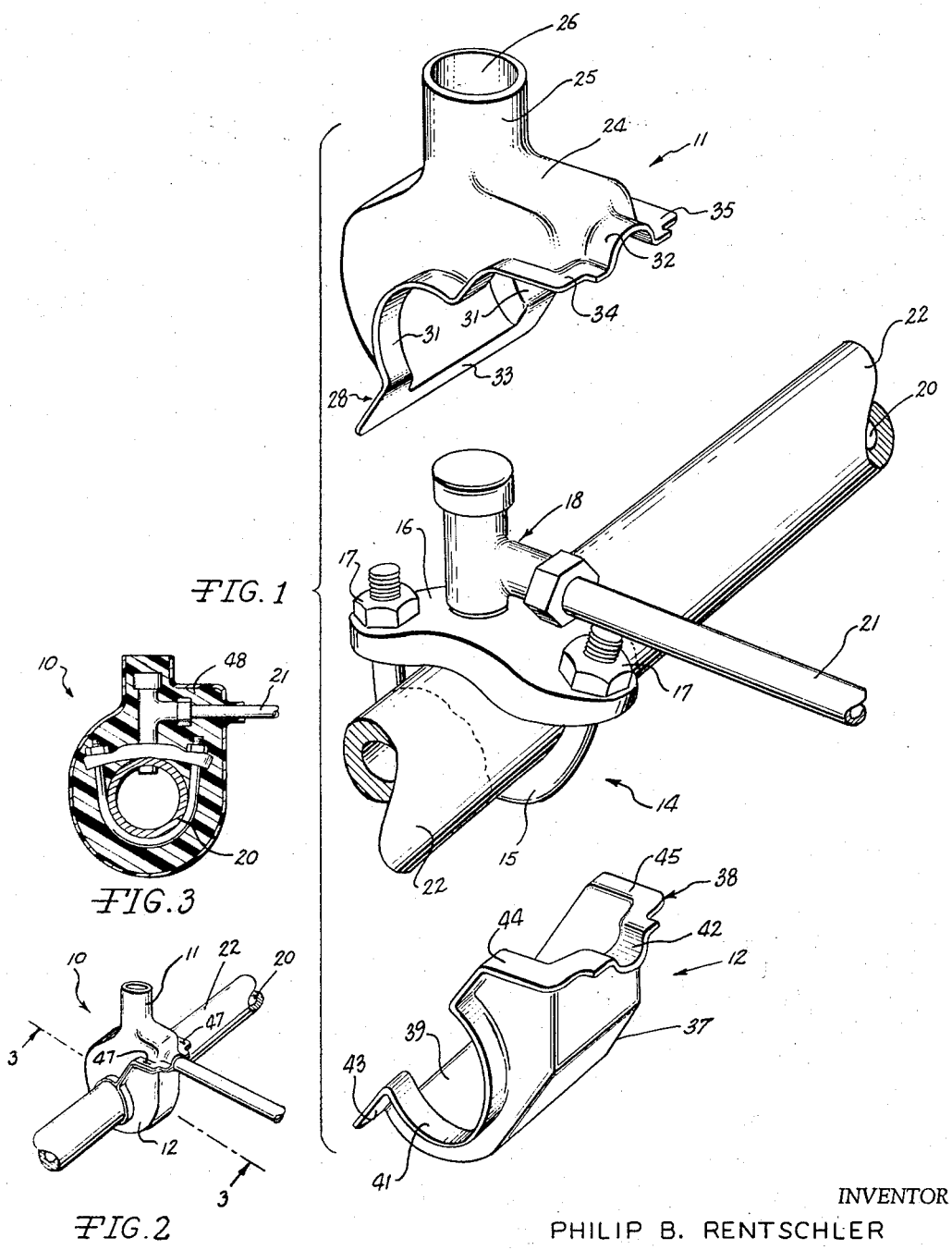

The present invention relates broadly to a new and useful pipe juncture sealing procedure and a covering article of manufacture, and more specifically to the method of isolating and covering a service line to main connection with a corrosive preventing material as well as a housing assembly to receive and hold the corrosive preventing covering material.

The art of covering a piping juncture to prevent corrosion has been a well practiced art. However, even with many new valve applications coming into being over the years the techniques used by industry in applying corrosive preventing material to pipe assembly units still relies on very crude and unimaginative methods. One area of this art which has developed rapidly is the self-tapping valve which is installed along a gas transmission main to form a pipe juncture. In this application the earth is removed from around the transmission main and a self-tapping valve member is secured to it with a transmission service line lead off being directed toward the point of use. It is important that this valve unit be protected against corrosive deterioration by having all its surfaces adequately covered. One of the standard methods presently being used to protect the pipe juncture is to cover the valve member and adjacent exposed pipe by applying a cathodic protective material on all surfaces which can be reached thus preventing deterioration of the valve by a corrosive or an electrolytic action. Often when this method is used, there is a time delay between the application of the cathodic protective material and the backfilling of the transmission main hole with earth. This requires persons to unnecessarily restrict and control work schedules and sometimes it is necessary that the transmission main hole be left open for a period of time after the work is completed, and if the work schedules must move in a certain pattern, the transmission main hole may be required to be left open all night. Not only does this cause undue expense, but it also exposes the installing company to possible legal action, and the general public to possible injury.

This method of corrosively protecting the pipe juncture is quite messy and costly, and it requires the attention of the worker to make sure that all surfaces of the valve member are adequately covered. If all surfaces of the valve unit have not been properly covered with the cathodic protective material, corrosive or an electrolytic action will take place and create gas leakage which causes the expense of detecting and repairing the leak plus the loss of the gas. The leaking gas also gives rise to damage because of its toxic and explosive effects.

It was a recognition of the above problems and difficulties concerned in easily, economically, and properly covering a pipe juncture with corrosive preventing material, and a lack of any completely satisfactory commercial solution for this problem, which led to the conception and development of the present invention.

Accordingly, among the objects of the present invention is a provision of an improved process for the covering of a pipe juncture with a corrosive preventing material.

Another object of the present invention is to provide a process where the complete covering of a valve unit with a corrosive preventing material can be provided for by an operator having a minimum of training and experience.

Another object of the present invention is to provide a process of providing a cathodic protective covering of a valve member for underground application where the valve member can be backfilled immediately without waiting for the cathodic protective material to set up.

Another object of the present invention includes the provision of a housing assembly locating off the piping elements to completely enclose without contacting a valve assembly member and providing a body housing unit to receive and retain a cathodic protective material while it protectively covers the valve assembly member.

A further object of the present invention is to provide a body housing assembly which has two housing members which locate off the piping elements and contact each other by flange edges which can be secured together creating a corrosive preventive material receiving chamber thus permitting the valve to be completely covered by the corrosive preventive material supplied through a provided inlet.

A further object of the present invention is to provide a cathodic protective product receiving body housing assembly made out of non-conductive material which is located off the protected surfaces of a transmission main and off a transmission service line for housing a pipe juncture in a non-contacting matter.

Also, an object of the present invention includes the provision of a housing assembly to receive and hold a corrosive preventive material capable of accomplishing the above objective at a minimum of material cost and fabricating expense, and at the same time being composed of a simple and ruggedly formed structure which is very reliable in application.

Other objects and advantages of the present invention will become apparent from the following detailed description and claims taken in connection with the accompanying drawings which form part of the instant specification and which are to be read in conjunction therewith, and in which like reference numerals are used to indicate like parts in various views.

FIGURE 1 is an exploded perspective view of a valve assembly member connected to a transmission main and a valve enclosing housing assembly illustrating the principles of the present invention.

FIGURE 2 is a perspective view of the valve enclosing housing assembly after it has enclosed the valve assembly member illustrated in FIGURE 1.

FIGURE 3 is a partial sectional view of the valve assembly member, taken along line 3—3 of FIGURE 2, showing the valve housing assembly filled with anti-corrosive material, viewed in the direction of the arrows.

FIGURE 4 is an alternate embodiment showing an exploded perspective view of a valve assembly member and a valve enclosing housing illustrating the principles of the present invention.

FIGURE 5 is the alternate embodiment showing a perspective view of the valve enclosing housing of FIGURE 4, illustrating the alternate embodiment of the valve enclosing housing after it has enclosed the valve assembly member.

Referring generally to FIGURES 1, 2 and 3, there is shown a housing assembly 10 which consists of an upper housing member 11 and a lower housing member 12. The housing assembly 10 in its assembled position forms a pocket enclosing a valve member 14. For the present illustration, a self-tapping valve assembly is illustrated. The valve member 14 has a yoke securing means 15 which is secured to a valve saddle member 16 by nuts 17. A valve outlet assembly 18 is supported by the valve saddle member 16.

A transmission main 20 has the valve member 14 secured to it in a manner well known in the art. The transmission main 20 could be similar to a main supplying natural gas to homes for home heating, hot water heating, et cetera. The valve outlet assembly 18 is tapped into the transmission main 20 receiving the material to be moved, such as natural gas, and passing it out to the source of use through a transmission service line 21. Normally, the valve member 14 is installed on a transmission main 20 at an underground location. When the valve assembly 14 is to be installed, a hole will be dug around the transmission main 20 and the self-tapping valve member represented by valve member 14 is installed by stripping off a portion of a corrosive preventing material 22 which covers transmission 20, shown in phantom in FIGURE 1. A cathodic protective covering or coating, hereinafter called anti-corrosive, will be placed over the pipe juncture, in the present illustration the valve member 14 and the stripped portion of the main 20. This protection is necessary to prevent corroding or an electrolytic action from taking place between the ground elements and the pipe juncture after backfilling.

The present invention illustrates the housing assembly 10 which forms a non-contacting pocket about the valve member 14 by positioning and locating itself off the transmission main 20 and the transmission service line 21. The housing assembly 10 can be made of various materials such as a non-conductive plastic. The upper housing member 11 has a body portion 24 which has an inlet port 25 on its upper side provided with an inlet hole 26. The body portion 24, in a preferred embodiment, has a flange member 28 extending substantially from its lower periphery. The flange member 28 has two positioning flanges 31 which locate upper housing member 11 along the transmission main 20. The upper housing member 11 is located on the transmission service line 21 by a positioning flange 32 of flange member 28. The positioning flanges 31 are connected to each other by a sealing flange 33 and connected to the positioning flange 32 by sealing flanges 34 and 35.

The lower housing member 12 has a body portion 37 and in its preferred embodiment a flange member 38. The body portion 37 is provided with a well portion 39, the purpose of which will be explained in more detail below. The flange member 38 has positioning flanges 41 (only one flange 41 being shown in FIGURE 1) which position the lower housing member 12 on transmission main 20. Flange member 38 has a positioning flange 42 positioning the lower housing member 12 on the transmission service line 21. Positioning flanges 41 are connected together by a sealing flange 43 and connected to positioning flange 42 by sealing flanges 44 and 45.

After a hole has been dug out around transmission main 20 and the valve member 14 connected to it, the lower housing member 12 can be placed in position by locating positioning flange 42 on transmission service line 21 and by locating positioning flanges 41 on the corrosive preventing material 22 of transmission main 20. Then the upper housing member 11 can be placed in position by locating positioning flange 32 on transmission service line 21 and by locating positioning flanges 31 on the corrosive preventing material 22 of transmission main 20. The upper housing member 11 and lower housing member 12 will not contact the valve member 14, but will provide a spaced pocket around the pipe juncture. Upper housing member 11 and lower housing member 12 will be in contact with the corrosive preventing material 22 of transmission main 20 and transmission service line 21 by flanges 31—31 and 32, and 41—41 and 42, respectively. Sealing flanges 33, 34 and 35 of upper housing member 11 will be in contact with sealing flanges 43, 44 and 45 of lower housing member 12, respectively. The upper housing member 11 and the lower housing member 12 can be secured together in various manners. One example would be to wrap friction tape around the two members 11 and 12 bonding them together and holding them in position on transmission main 20 and transmission service line 21. Another method would be to staple the above mentioned contacting sealing flanges together with staples 47, as illustrated in FIGURE 2. After the housing members 11 and 12 are secured, the housing assembly 10 is formed and in condition to receive anti-corrosive material. Various materials are available, and would be desirable for use in various applications. One type of anti-corrosive material would be a coal tar derivative paste which could be forced in through inlet hole 26 of inlet port 25, filling the pocket provided by housing assembly 10 and covering all the exposed surfaces of the valve member 14 very quickly. Another anti-corrosive material which might be used would be a polyurethane foam which would include mixing predetermined quantities of diisocyanates with a suitable polyol or a suitable mixture of polyols. If these materials are to be mixed in a liquid state in the housing assembly 10, the well portion 39 will receive them, preventing them from draining out through the sealing flange connections until chemical reaction takes place causing polyurethane foam to be produced and cover the exposed surfaces of the valve member 14. Either method permits the transmission main hole which was provided for the installation of the valve member 14 to be immediately covered up. FIGURE 3 illustrates a sectional view of the housing assembly 10 and the valve member 14 after an anti-corrosive material 48 has filled the pocket and covered all the exposed surfaces within the pocket.

Referring generally to FIGURES 4 and 5, there is shown an alternate housing assembly 110 which consists of an upper housing member 111 and a lower housing member 112. The housing assembly 110 in its assembled position, as shown in FIGURE 5, forms a pocket enclosing a valve member 114. This illustration discloses an alternate self-tapping valve assembly similar to valve member 14 of FIGURE 1. The valve member 114 has a securing member 115 which is secured to an outlet support 116 by a nut threaded on bolt 117. A valve outlet assembly 118 is supported by the outlet support 116. The valve member 114 is secured on the transmission main 20 similar to valve member 14, as discussed above.

The present illustration of the invention discloses the housing assembly 110 which forms a non-contacting pocket about the valve member 114 by locating itself off the transmission main 20 and the transmission service line 21 which is connected to the valve outlet assembly 118. The upper housing member 111 has a body portion 124 which has a cover member 125. The cover member 125 is connected with an inlet hole 126 by a hinge edge 127. The body portion 124 has a flange member 128 extending substantially from its lower periphery. The flange member 128 has two positioning flanges 131 (only one flange 131 being shown in FIGURE 4) which locate upper housing member 111 along the transmission main 20. The upper housing member 111 is located on the transmission line 21 by a positioning flange 132 of flange member 128. The positioning flanges 131 are connected to each other by a sealing flange 133 and connected to the positioning flange 132 by sealing flanges 134 and 135.

The lower housing member 112 has a body portion 137 and a flange member 138. The body portion 137 is provided with a side wall member 136 and bottom portions 140 and a well portion 139. The purpose of the well portion 139 of body portion 137 is to receive anti-corrosive material when necessary similar to well portion 39 of housing assembly 10. The flange member 138 has positioning flanges 141 which position the lower housing member 112 on transmission main 20. Flange member 138 has a positioning flange 142 positioning the lower housing member 112 on the transmission line 21. Positioning flanges 141 are connected together by a sealing flange 143 and connected to the positioning flange 142 by sealing flanges 144 and 145.

After a hole has been dug in the ground around the transmission main 20 and the valve member 114 has been connected to the transmission main 20, the lower housing member 112 is placed in position by locating positioning flange 142 on the transmission line 21 and by locating positioning flanges 141 on transmission main 20. Then the upper housing member 111 is placed in position by locating positioning flange 132 on transmission line 21 and by locating positioning flanges 131 on transmission main 20. The upper housing member 111 and the lower housing member 112 will not contact the valve member 114 but provide a spaced pocket around it. The upper housing member 111 and the lower housing member 112 will be in contact with transmission main 20 and transmission line 21 by flanges 131—131 and 132, and 141—141 and 142, respectively. Sealing flanges 133, 134, and 135 of upper housing member 111 will be in contact with sealing flanges 143, 144 and 145 of lower housing member 112, respectively. The upper housing member 111 and lower housing member 112 can be secured together in various manners; for example, by using the methods suggested above in securing upper and lower housing members 11 and 12. In the present illustration flange member 128 is provided with securing holes 129 and flange member 138 is provided with securing holes 130. A securing screw 147 is threaded through securing holes 129 of flange member 128 contacting and threaded into an aligned securing hole 130 of flange member 138, drawing the respective sealing flanges 128 and 138 together. The upper and lower housing members 111 and 112 are then held in their assembled condition and the housing assembly 110 is in condition to receive anti-corrosive material. The cover member 125 acts as a protective cover to the housing assembly 110 so that foreign matter will not inadvertently drop in to the housing assembly 110 once it has formed its non-contacting pocket about valve member 114. The cover member 125 is raised up permitting anti-corrosive material to be inserted into the housing assembly 110 to cover all exposed surfaces of the valve member 114.

While but two forms of the invention have been shown and described, other forms and procedures will now be apparent to those skilled in the art. An example of a change which is intended to be within the spirit and scope of this invention would be to eliminate the flange members provided upon the upper and lower housing members. The housing members could then be held together by tape with the filling method discussed above being followed. In some applications it may be desirable to provide the inlet hole in the lower housing member in place of in the upper housing member. After the housing assembly has been placed over the pipe juncture the hole may be backfilled up to the housing assembly. The anti-corrosive material will then be passed into the housing assembly after which the backfilling operation will be completed. Therefore, the embodiments shown in the drawings are merely for illustrative purposes and are not intended to limit the spirit and scope of the invention as above described and illustrated in the drawings.

Other modes of applying the principle of my invention may be employed instead of those explained, change being made as regards the means and the methods herein disclosed provided those stated by any of the following claims or their equivalent be employed.

I therefore particularly point out and distinctly claim as my invention:

1. An anti-corrosive material receiving system for a pipe juncture comprising, in combination
    (a) a housing assembly surrounding said pipe juncture and having upper and lower housing members,
    (b) a transmission main passing through said housing assembly,
    (c) a transmission service line connected with said transmission main and passing from said housing assembly,
    (d) said lower housing member having at least three positioning means two of which are to locate off said transmission main and one of which is to locate off said transmission service line and forming part of a pocket in a non-contacting relationship to said pipe juncture,
    (e) said upper housing member having at least three positioning means two of which are to locate on said transmission main and one of which is to locate off said transmission service line and forming part of a pocket in a non-contacting relationship to said pipe juncture,
    (f) securing means to hold said upper and lower housing members to form said housing assembly, and
    (g) an inlet means to permit anti-corrosive material to pass into said housing assembly.

2. An anti-corrosive material receiving system as defined in claim 1, wherein
    (a) said upper and lower housing members have flange members, and
    (b) said flange members have positioning flanges which connect said positioning means.

3. An anti-corrosive material receiving system as defined in claim 2, wherein
    (a) said flange members of said upper and lower housing members make sealing contact together.

4. An anti-corrosive material receiving system as defined in claim 3, wherein
    (a) said securing means includes said flange members and a securing member physically holding said flange members of said upper housing member in secured contact with said adjacent flange members of said lower housing member.

5. An anti-corrosive material receiving system as defined in claim 4, wherein
    (a) a cover member connected to and covering said inlet means and permitting the passage of said anti-corrosive material into said housing assembly, and
    (b) said housing assembly is made of non-conductive material.

6. An anti-corrosive material receiving system as defined in claim 1, wherein
    (a) said lower housing member has a well portion to receive materials which will react chemically forming said anti-corrosive material within said housing assembly.

7. A method of covering a pipe juncture between a transmission main and a transmission service line with a cathodic protective material which comprises,
    (a) forming an exposed area by stripping the corrosive protection material off said transmission main,
    (b) mounting said transmission service line to said transmission main at said exposed area,
    (c) placing a lower housing member in a non-contacting position substantially below the bottom portion of said pipe juncture,
    (d) positioning said lower housing member off said transmission main at one position on both sides of said exposed area and one position on said transmission service line,
    (e) placing an upper housing member in a non-contacting position substantially above the upper portion of said pipe juncture,
    (f) positioning said upper housing member off said transmission main at one position on both sides of said exposed area and one position on said transmission service line in a contacting position with said lower housing member,
    (g) securing said upper housing member to said lower housing member forming a non-contacting pocket to completely enclose said pipe juncture,
    (h) providing an inlet means into said pocket, and
    (i) filling said pocket with a cathodic protective material completely covering said valve member.

8. A method of covering a pipe juncture with cathodic protective material as defined in claim 7 which comprises,
    (a) passing materials through an inlet into said pocket so they can chemically react to form a complete anti-corrosive covering over said pipe juncture.

9. A method of covering a pipe juncture with a cathodic protective material as defined in claim 7 which comprises,
 (a) securing said upper and lower housing members together by driving staples through flange edges.

10. A method of covering a pipe juncture with a cathodic protective material as defined in claim 7 which comprises,
 (a) removing earth to form a hole about said transmission main, and
 (b) backfilling said transmission main hole after said pocket has been filled with the cathodic protective material.

References Cited
UNITED STATES PATENTS 1,108,840    8/1914   Franke _____ 137—375
3,177,528    4/1965   Flower et al. _____ 137—375 XR HENRY T. KLINKSIEK, *Primary Examiner.*